Patented June 3, 1947

2,421,554

UNITED STATES PATENT OFFICE 2,421,554

CATALYTIC CLEAVAGE OF GLYCOLS

Harry de V. Finch, Berkeley, and Seaver A. Ballard, Oakland, Calif., assignors to Shell Development Company, San Francisco, Calif., a corporation of Delaware No Drawing. Application May 1, 1943, Serial No. 485,556

1 Claim. (Cl. 260—603)

This invention relates to a process for the cleavage of dihydroxy alcohols to aldehydes or ketones and olefins in the presence of non-basic dehydration catalysts.

The process of the invention comprises contacting a glycol which has at least one carbinol group directly joined to a non-carbinolic carbon atom to which a hydrogen atom is attached, with a non-basic dehydration catalyst at an elevated temperature and preferably at a temperature of at least about 160° C. but below that temperature at which excessive decomposition of the treated glycol and/or reaction products takes place.

Suitable glycols which may be used as starting materials for the production of aldehydes or ketones and olefins in accordance with the process of the invention may be represented by the general formula

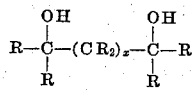

wherein $x$ is any whole number and any or all of the R's may represent the same or different substituents of the group consisting of the hydrogen atom and hydrocarbon radicals, except that at least one carbon atom directly linked to one of the carbinolic carbon atoms should have at least one hydrogen atom attached thereto, e. g. at least one R in the $CR_2$ group must be hydrogen when none of the R's directly connected to any of the carbinol groups is an

group. Any or all of the hydrocarbon groups may contain substituents such as halogen, nitrogen containing groups, or other suitable groups or elements which may be non-reactive or which may be split off or otherwise reacted without interfering with the process of the invention. Suitable hydrocarbon or substituted hydrocarbon radicals which R may represent may be saturated or unsaturated, cyclic or acyclic, and include alkyl, alkenyl, aryl, aralkyl, alkaryl, cycloaliphatic, alicyclic and heterocyclic groups such as methyl, ethyl, n-propyl, isopropyl, n-butyl, tertiary butyl, hexyl, cyclohexyl, phenyl, isophoryl, chlorbutyl and the like, and their homologues and analogues and suitable substitution products. In most cases, saturated or aromatic hydrocarbon radicals are preferred.

The glycol to be used in any particular case will depend upon the product or products desired. In most cases, we prefer to employ glycols having the two carbinol groups separated by just one carbon atom and having directly connected to at least one of the carbinol groups a carbon atom to which at least one hydrogen atom is attached. We find that glycols having one carbinol group tertiary, and the other secondary and separated from the first by a single carbon atom, and having the tertiary carbinol group attached to at least one carbon atom to which at least one hydrogen atom is attached, are most preferable for the reaction. The cleavage of a member of this preferred class results in the formation of an olefin and an aldehyde. Those glycols containing one primary carbinol group are to be preferred over those having both carbinol groups secondary or both tertiary. If one carbinol group is tertiary and the other primary, an olefin and formaldehyde or a ketone will be formed; while if a glycol having both carbinol groups tertiary is cleaved according to the process herein described, a ketone and an olefin will be formed. The cleavage of a glycol containing two secondary carbinol groups will result in the formation of an olefin and an aldehyde. Aliphatic glycols are preferable to those containing aromatic groups if all other considerations are the same. Suitable glycols to be employed in the execution of the process of this invention include 1,3-propanediol, 2-methylpentane-2,4 - diol, 2 - ethylpentane - 2,4-diol, 2-chlorbutylpentane-2,4-diol, 2-phenylpentane-2,4-diol, 2-methylhexane-2,4-diol, 2,5-dimethylhexane-2,4-diol, 4-methylhexane-2,4-diol, and the like and their homologues and analogues. Such glycols may be obtained by hydrogenation of the corresponding keto alcohol, as by the hydrogenation of diacetone alcohol to 2-methylpentane-2,4-diol, or by other suitable methods.

The general reaction involved may be illustrated by reference to the following equation representing the cleavage of 2-methylpentane-2,4-diol to give isobutylene and acetaldehyde:

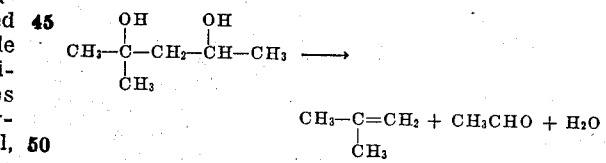

The process may be executed in batchwise, intermittent or continuous manner and may be carried out in vapor or liquid phase, although the vapor phase reaction is preferred for higher yields. Atmospheric or elevated or reduced pressures may be employed.

The process may be carried out in any suitable apparatus. One simple assembly which has been found to be useful for vapor phase dehydration comprises a gas-fired furnace containing a steel catalyst tube. The feed may be vaporized in the first section of the tube, which is empty, and passed directly over the heated catalyst which may be advantageously in the form of granules. The products may be cooled in a water-cooled condenser, and condensable gases may be caught in a dry ice-cooled trap. The organic material may be combined and fractionated to separate the products.

Any suitable elevated temperature may be used. We have found that good yields may be obtained at temperatures of at least about 160° C. Temperatures above about 500° C. are in most cases undesirable since they favor thermal decomposition with the formation of by-products of little value, such as carbon monoxide, and help promote resinification of the reaction products resulting in coating the catalyst, with a corresponding reduction in activity.

Our preferred non-basic dehydration catalysts include essentially neutral substances like silicates, clay, charcoal, pumice, porous porcelain chips, active silica, kieselguhr, etc. Also, on the preferred list of dehydration catalysts are those of an acid nature, such as the acids of phosphorus, including ortho and meta phosphoric acids, phosphorous acid, hypophosphorous acid, hypophosphoric acid, and pyrophosphoric acid. Salts of acids of phosphorus including, for example, those of the alkali and/or alkaline earth metals, of zinc, cadmium, mercury, aluminum, boron, titanium, lead, tin, vanadium, chromium and tellurium may be used in place of or in addition to the acids. The term "acid of phosphorus catalyst" is used herein and in the appended claim to designate catalysts consisting of acids of phosphorus and/or their derivatives, particularly the acid salts thereof; e. g. the term "phosphoric acid catalyst" is meant to include phosphoric acid and/or an acid salt thereof. Other catalysts of an acidic character which may be used are, for example, silica gel, boryl phosphate, zinc chloride, ferric chloride, sulfuric acid, sodium bi-sulfate, aluminum sulfate, etc. Single catalysts or mixtures of different catalysts may be employed, and they may be used with or without promoters and/or supports such as pumice, silica gel, Activated Alumina, activated charcoal, kieselguhr, etc.; for example, aluminum sulfate on pumice, sodium dihydrogen phosphate on Activated Alumina, sodium dihydrogen phosphate on pumice, etc. An advantageous method of preparing catalysts within the preferred group is described, for example, in United States Patent No. 2,018,065 and in United States Patent No. 2,051,444, but other methods may also be used, and in certain cases modification of the method of the patent may be desirable, especially with a view to reducing the final free acid content of the catalyst.

Depending on the reaction conditions, side reactions, such as dehydration to the corresponding diene, polymerization of the olefin formed and thermal decomposition with evolution of carbon monoxide, may occur. These reactions may be substantially completely avoided or suppressed by proper choice of catalyst and/or operating conditions. Low acidities are desirable where polymerization of the olefin produced, particularly a tertiary olefin such as isobutylene, is to be avoided. Therefore, a free acidity of not more than about 10% calculated as $H_3PO_4$ is desirable with an acidity of below about 5% even more advantageous.

For purposes of illustration only, reference will be had to the following specific examples setting out the mode of executing the invention.

Example I 2-methylpentane-2,4-diol was passed over a silica gel catalyst at a temperature of from about 280° C. to about 300° C., at a flow rate of about 4.3 cc. per minute per 100 cc. of reaction space. The products were cooled and collected in suitable traps and were separated by fractionation, showing a yield of isobutylene plus acetaldehyde equivalent to about 56 mole per cent of feed.

Example II

Pumice was heated to a temperature of from about 370° C. to about 390° C., and vapors of 2-methylpentane-2,4-diol were passed over it at the rate of about 3.1 cc. per minute per 100 cc. of reaction space. A yield of isobutylene plus acetaldehyde equivalent to about 68 mole per cent of the feed was obtained.

Example III

Vapors of 2 - methylpentane - 2,4 - diol were passed over activated charcoal at a temperature of from about 350° C. to about 370° C., at a rate of about 3 cc. per minute per 100 cc. of reaction space. Isobutylene plus acetaldehyde were produced in an amount equivalent to about 57 mole per cent of the feed.

Example IV

When the feed consisting of a solution of about 80 per cent 2-methylpentane-2,4-diol in water was passed at a rate of about 4.1 cc. per minute per 100 cc. of reaction space over aluminum sulfate on a support of pumice at a temperature of from about 270° C. to about 290° C., about 39 mole per cent of the feed was converted to isobutylene and acetaldehyde.

Example V

A solution of about 80 mole per cent 2-methylpentane-2,4-diol in water was passed over sodium dihydrogen phosphate on Activated Alumina at a temperature of from about 270° C. to about 290° C. at a flow rate of about 3.2 cc. per minute per 100 cc. of reaction space. The conversion to isobutylene plus acetaldehyde was in an amount equivalent to about 41 mole per cent of the feed.

It will thus be evident that this process provides a new source of a wide variety of valuable products including aldehydes, aldehyde derivatives, olefins and olefin derivatives. The process is capable of wide variation not only with respect to the glycol which may be reacted but also in regard to the non-basic catalyst and other operating details which may be adopted.

We claim as our invention:

A process for producing isobutylene and acetaldehyde which comprises contacting the vapors of 2-methylpentane-2,4-diol, with a dehydration catalyst comprising sodium dihydrogen phosphate on Activated Alumina, at a temperature of from about 200° C. to about 500° C.

HARRY DE V. FINCH.
SEAVER A. BALLARD.

(References on following page)

REFERENCES CITED

The following references are of record in the file of this patent:

UNITED STATES PATENTS

| Number | Name | Date |
|---|---|---|
| 1,755,692 | Hermann et al. | Apr. 22, 1930 |
| 2,087,038 | McMahon | July 13, 1937 |
| 1,421,640 | Whitaker et al. | July 4, 1922 |

FOREIGN PATENTS

| Number | Country | Date |
|---|---|---|
| 346,221 | Great Britain | Apr. 9, 1931 |
| 516,360 | Great Britain | Jan. 1, 1940 |

OTHER REFERENCES

"The Pyrolysis of Carbon Compounds," Hurd 1929, pp. 176–180.

Schmerling et al., "Jour. Am. Chem. Soc.," vol. 62, pp. 2446–2449 (1940).